G. T. Barker,
Cage Trap.

N° 38,458. Patented May 12, 1863.

Witnesses;
F. P. Hale Jr
Frederick Curtis.

Inventor;
G. T. Barker
by his attorney
R. H. Eddy

UNITED STATES PATENT OFFICE.

GARDNER T. BARKER, OF PITTSFIELD, MASSACHUSETTS.

IMPROVEMENT IN ANIMAL-TRAPS.

Specification forming part of Letters Patent No. 38,458, dated May 12, 1863.

*To all whom it may concern:*

Be it known that I, GARDNER T. BARKER, a citizen of the United States of America, and a resident of Pittsfield, in the county of Berkshire and State of Massachusetts, have invented an Improved Animal-Trap; and I do hereby declare the same to be fully described in the following specification, and represented in the accompanying drawings, of which—

Figure 3:
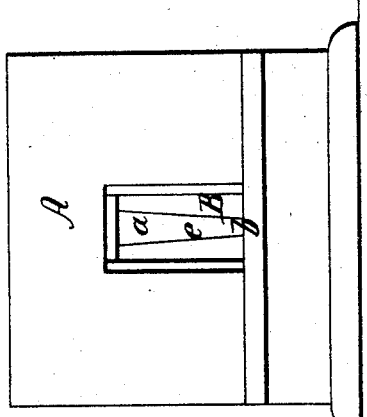
Figure 5:
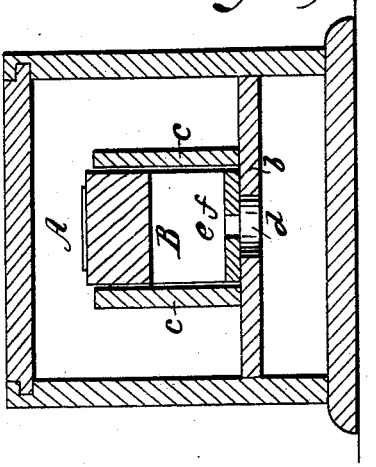
Figure 4:
Figure 1:
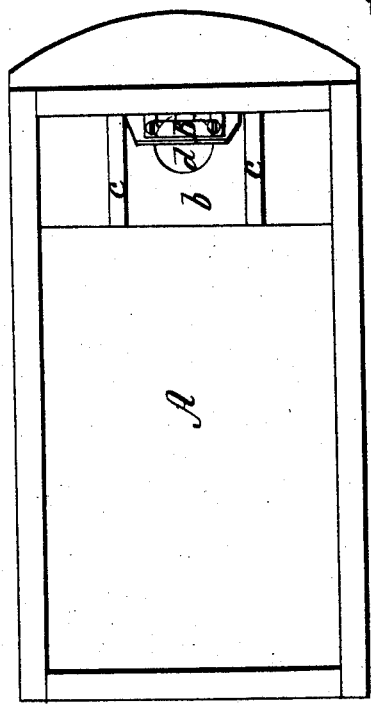
Figure 2:
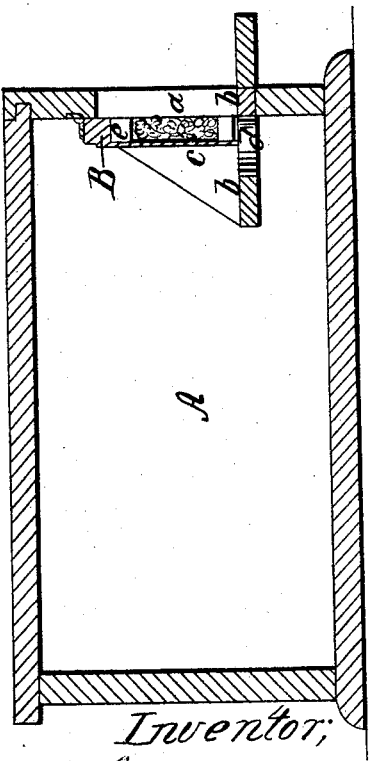

Figure 1 is a top view of the trap with its top board removed. Fig. 2 is a longitudinal and vertical section of it. Fig. 3 is a front end view. Fig. 4 is an edge view of the door. Fig. 5 is a vertical section taken widthwise through the door.

My invention is to be found in a peculiar combination of the door, its jambs, and an entrance port or passage, and also in the construction of the door, so as to hold or carry the bait.

In the drawings, A denotes the box of the trap, the same being provided with an opening, $a$, in one end of it. At the bottom of the opening $a$ there is a shelf, $b$, which extends through and in rear of the opening, as shown in Figs. 1 and 2. On the inside of the trap and on the extension of the shelf therein are two parallel vertical buttresses or jambs, $c\ c$, between which a swinging door, B, is placed, and at its top is hinged to the upper part of the door-opening $a$ in such manner as to enable the door to swing from a vertical position inwardly into an inclined one—such as would carry its lower end by and beyond an entrance-port, $d$, made downward through that part of the shelf $b$ which is in rear of the door when closed. The jambs, instead of being arranged as described, may be applied directly to the front face of the door and extend from its edges through the door-opening $a$, but I do not conceive this to be so good an arrangement of them as that first described. Their purpose is to prevent the escape of an entrapped animal during the efforts of another animal to make his way into the trap. The door is provided with a bait recess or chamber, $e$, opening out of the front face of the door, and having a passage, $f$, extending horizontally out of it and through either or both edges of the door. This passage enables the bait to be passed transversely through the door, or from edge to edge of it. The bait-opening in the front of the door also continues down to the bottom of the door, but this latter, however, is not essential to my invention. On approaching the trap, a mouse or other animal capable of being caught by it will discover the bait on or in the door, and in his endeavors to gnaw it will force the door rearward so as to uncover the hole $d$, into which he will pass, especially should he discover any bait on the bottom of the trap. After the animal may have passed through the hole the door will fall forward to a vertical position, and he will be entrapped, and the trap be set for taking another animal. In this way, so long as there may be any bait in or on the door, the trap will be ready for use, it being self-setting, in manner as described.

I claim—

1. The combination of the swing-door B, the buttresses or jambs $c\ c$, and the shelf with entrance-port $d$, the whole being arranged and applied together, substantially in manner and so as to operate as specified, the bait being applied to the door.

2. The improved swinging door, as provided with the bait-recess or chamber open in front, as described, or so made and provided with a lateral passage, as specified.

GARDNER T. BARKER.

Witnesses:
S. W. BOWERMAN,
L. H. GAMWELL.